May 20, 1924.

C. BARBIERI 1,495,038

AUTOMATIC CUP FORMING MACHINE

Filed Oct. 28, 1918    11 Sheets-Sheet 1

Witness:
H. L. Jamington

Inventor
Cesare Barbieri
By Burton & Hille Atty.

May 20, 1924.

C. BARBIERI 1,495,038

AUTOMATIC CUP FORMING MACHINE

Filed Oct. 28, 1918    11 Sheets-Sheet 5

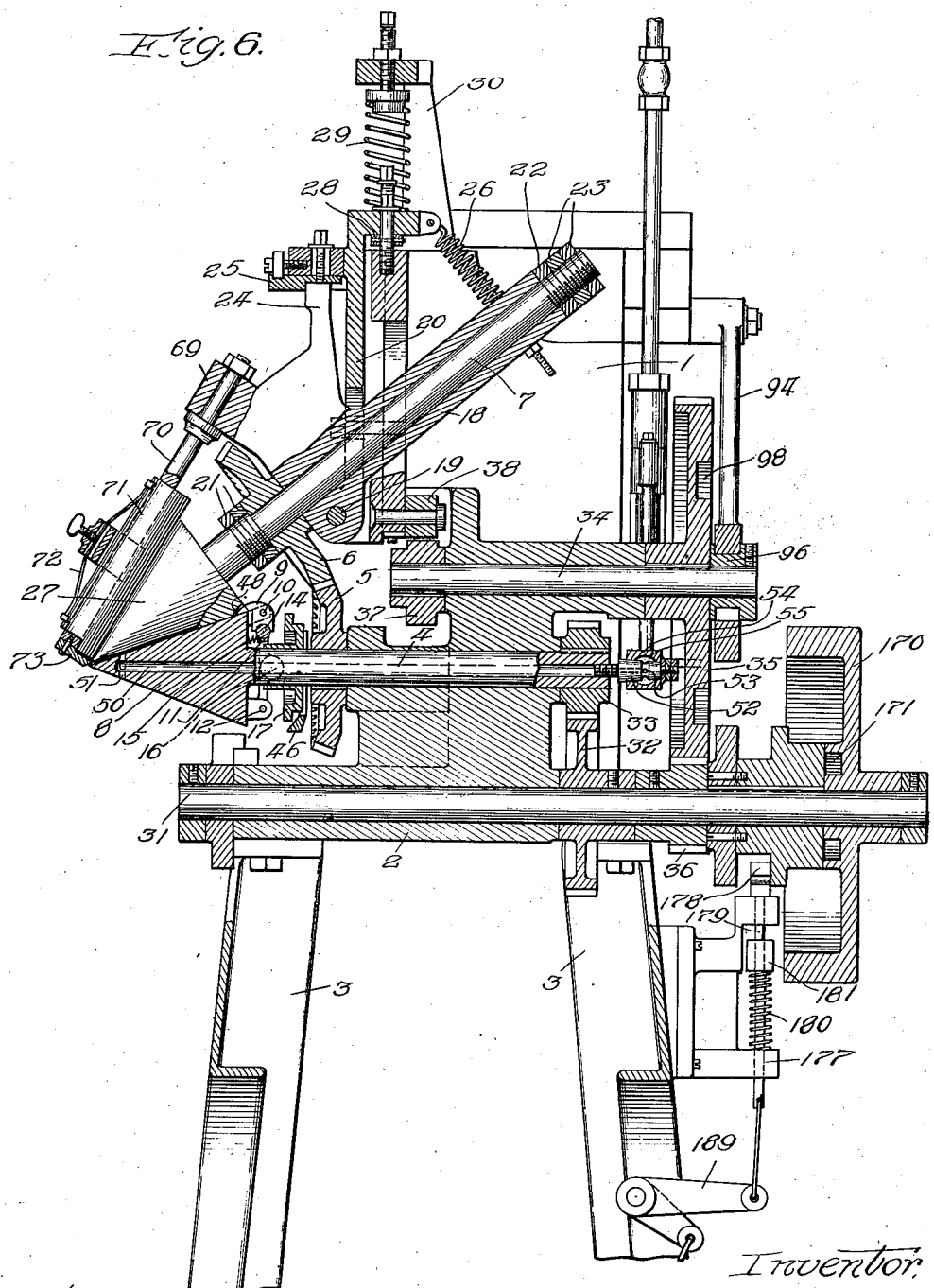

May 20, 1924.
C. BARBIERI
AUTOMATIC CUP FORMING MACHINE
Filed Oct. 28, 1918     11 Sheets-Sheet 7
1,495,038
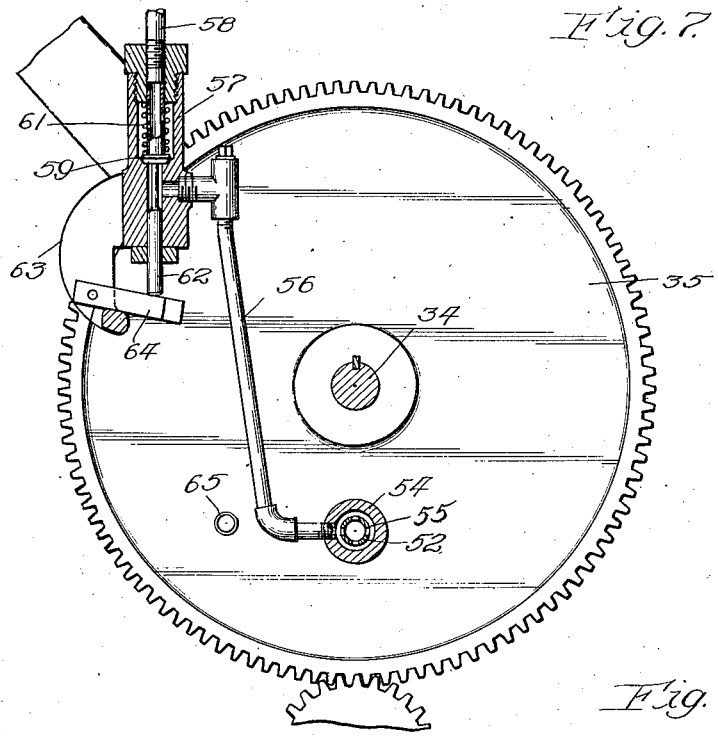
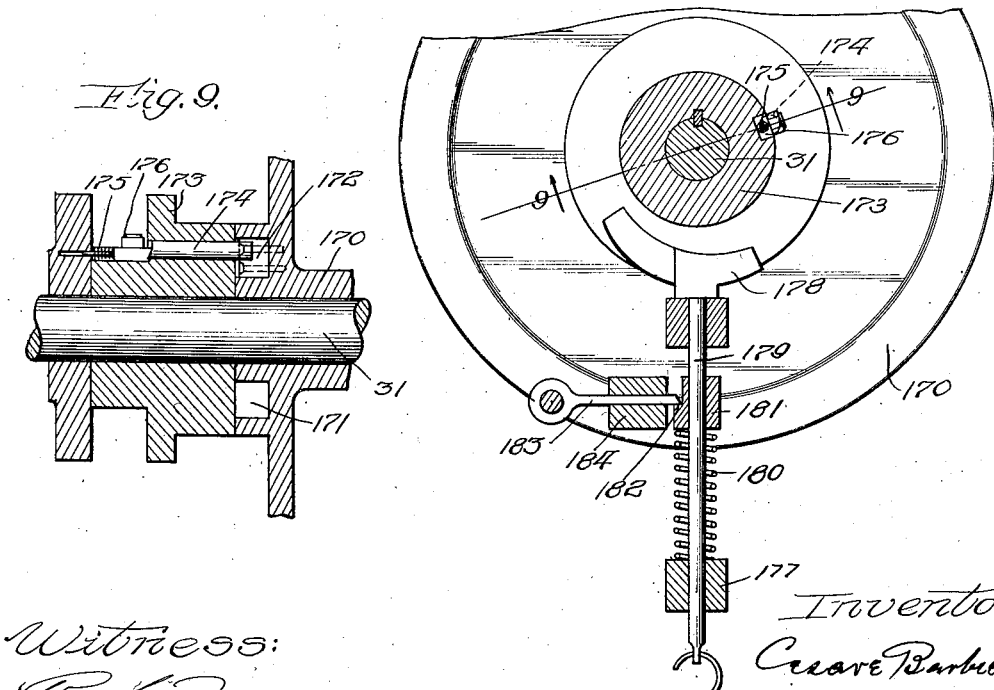

May 20, 1924.
C. BARBIERI
AUTOMATIC CUP FORMING MACHINE
Filed Oct. 28, 1918  11 Sheets-Sheet 8
1,495,038
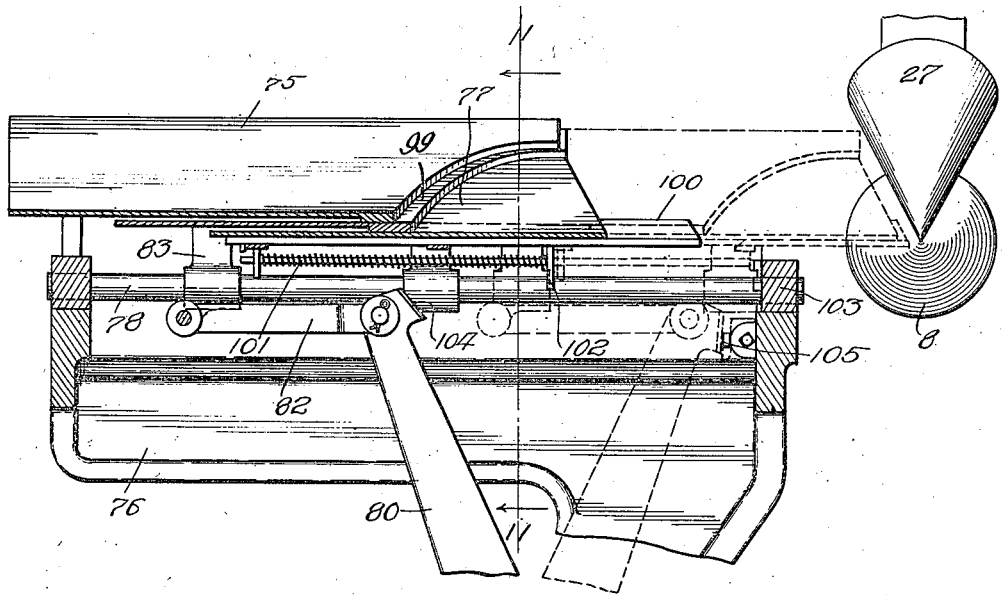
Fig. 10.
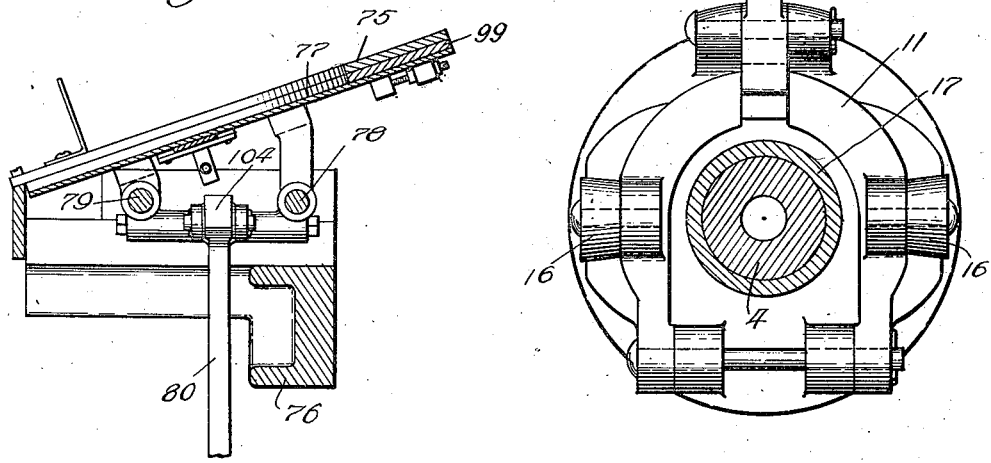
Fig. 11.
Fig. 12.
Witness:
R. L. Farrington
Inventor,
Cesare Barbieri
By Burton & Hills
Atty.

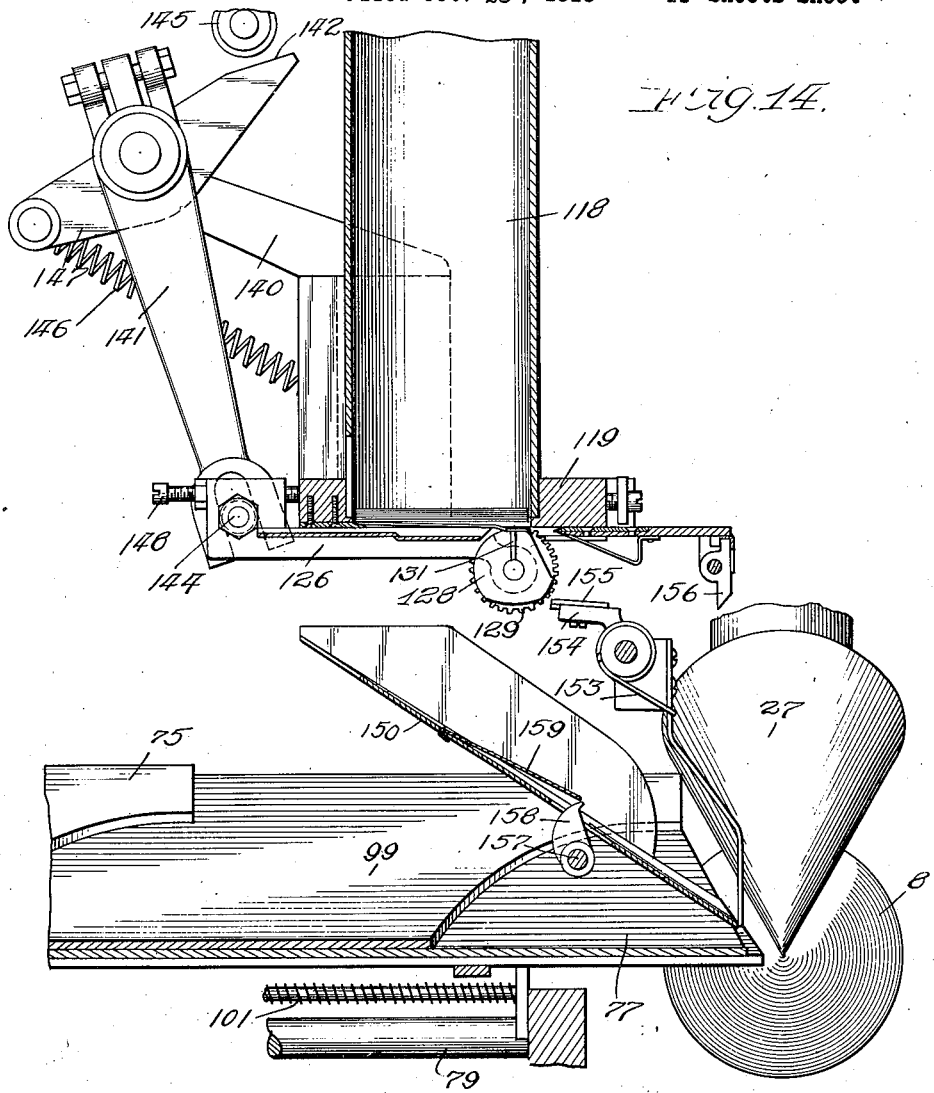
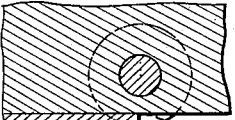

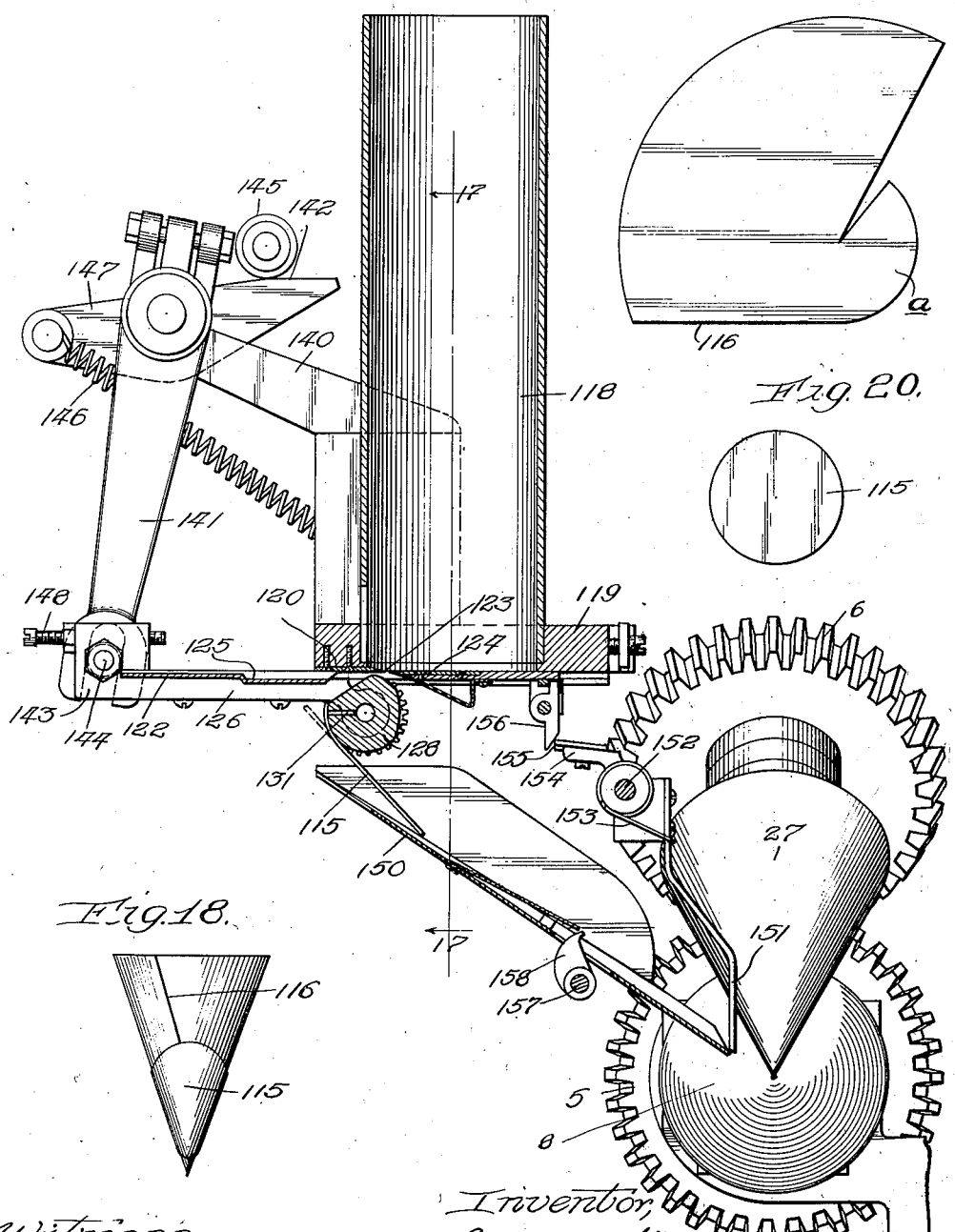

May 20, 1924.
C. BARBIERI
AUTOMATIC CUP FORMING MACHINE
Filed Oct. 28, 1918   11 Sheets-Sheet 11
1,495,038
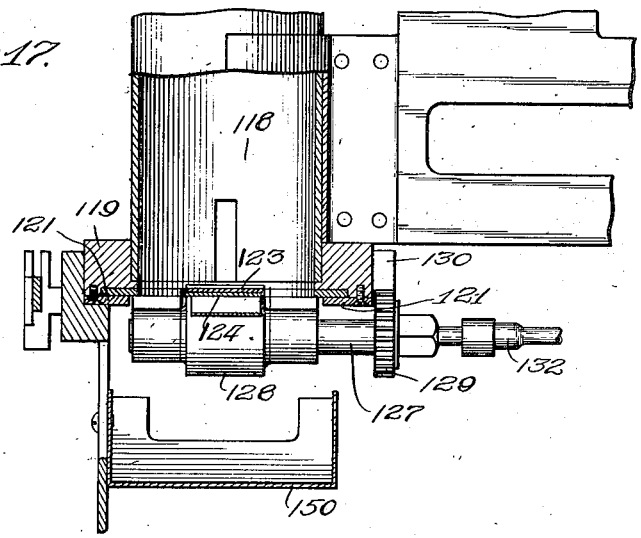
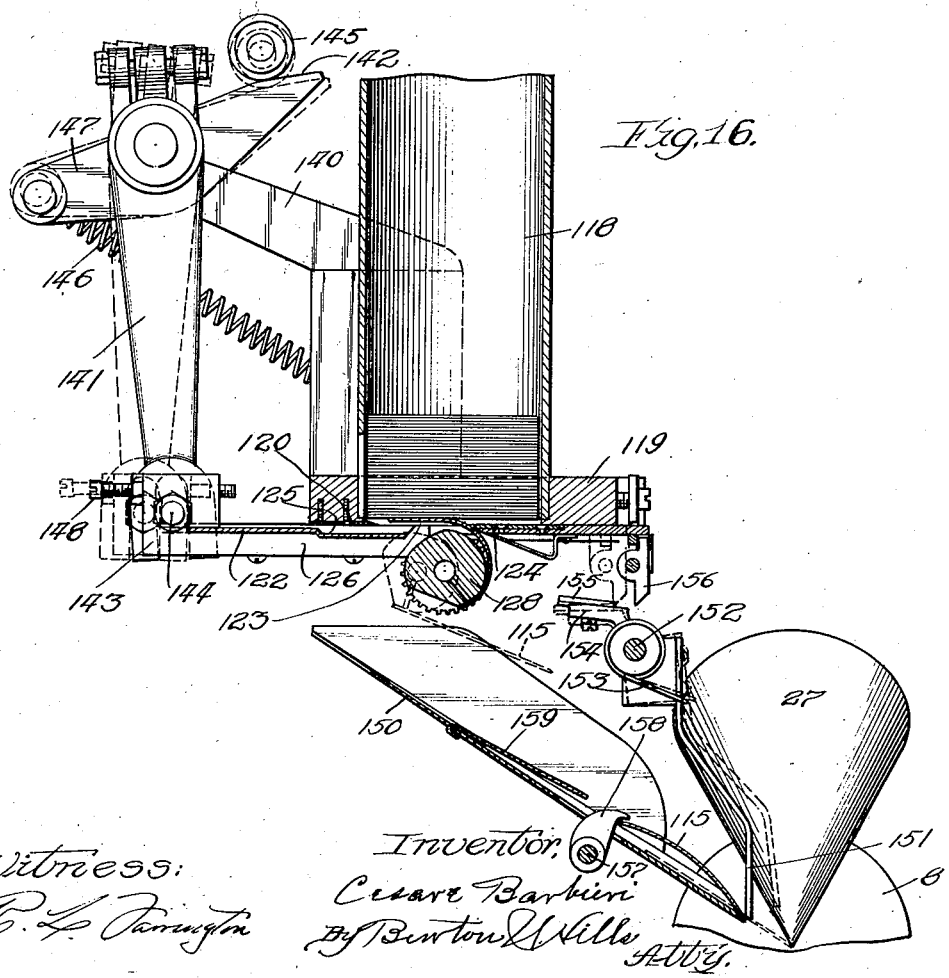

Patented May 20, 1924.

1,495,038

UNITED STATES PATENT OFFICE.

CESARE BARBIERI, OF WASHINGTON, DISTRICT OF COLUMBIA, ASSIGNOR TO THE VORTEX MANUFACTURING COMPANY, OF CHICAGO, ILLINOIS, A CORPORATION OF ILLINOIS.

AUTOMATIC CUP-FORMING MACHINE.

Application filed October 28, 1918. Serial No. 259,966.

*To all whom it may concern:*

Be it known that I, CESARE BARBIERI, a subject of the King of Italy, residing at Washington, in the District of Columbia, U. S. A., have invented certain new and useful Improvements in an Automatic Cup-Forming Machine, of which the following is a description.

My invention relates to automatic mechanism for forming conical cups of paper or other suitable sheet material from suitably formed blanks.

The object of my invention is to provide a comparatively simple, reliable and convenient device of the kind described, arranged to receive the flat blanks and to automatically form the same into a tapering cup and when required to finally place a tip or re-enforcing piece upon the side of the cup and seal the margins of the blank so that the finished cup will permanently retain its shape and be fluid tight.

To this end my invention consists in the novel construction, arrangement and combination of parts herein shown and described and more particularly pointed out in the claims.

In the accompanying drawings wherein like or similar reference characters indicate like or corresponding parts.

Fig. 6 is a section taken substantially on line 6—6 of Fig. 1.

Fig. 7 is an enlarged section taken substantially on line 7—7 of Fig. 2.

Fig. 8 is an enlarged section taken substantially on line 8—8 of Fig. 2.

Fig. 9 is a section taken substantially on line 9—9 of Fig. 8.

Fig. 10 is an enlarged section taken substantially on line 10—10 of Fig. 3.

Fig. 11 is a section taken substantially on line 11—11 of Fig. 10.

Fig. 12 is an enlarged section taken substantially on line 12—12 of Fig. 2.

Fig. 13 is an enlarged section taken substantially on line 13—13 of Fig. 2.

Fig. 14 is an enlarged section taken substantially on line 14—14 of Fig. 5 showing the several parts in their relative position at the commencement of an operative cycle of their movements.

Fig. 15 is a view similar to Fig. 14 showing the several parts in their relative positions at the completion of an operative cycle of their movements.

Fig. 16 is a view similar to Figs. 14 and 15 showing the several parts in their respective positions at approximately midway of an operative cycle of their movement.

Fig. 17 is a section taken substantially on line 17—17 of Fig. 15.

Fig. 18 is a completed cup as produced by my improvement.

Fig. 19 is a paper blank of the shape upon which my improved forming machine is particularly adapted to operate.

Fig. 20 is a tip or reinforcing member for the side of the cup.

Figure 1:
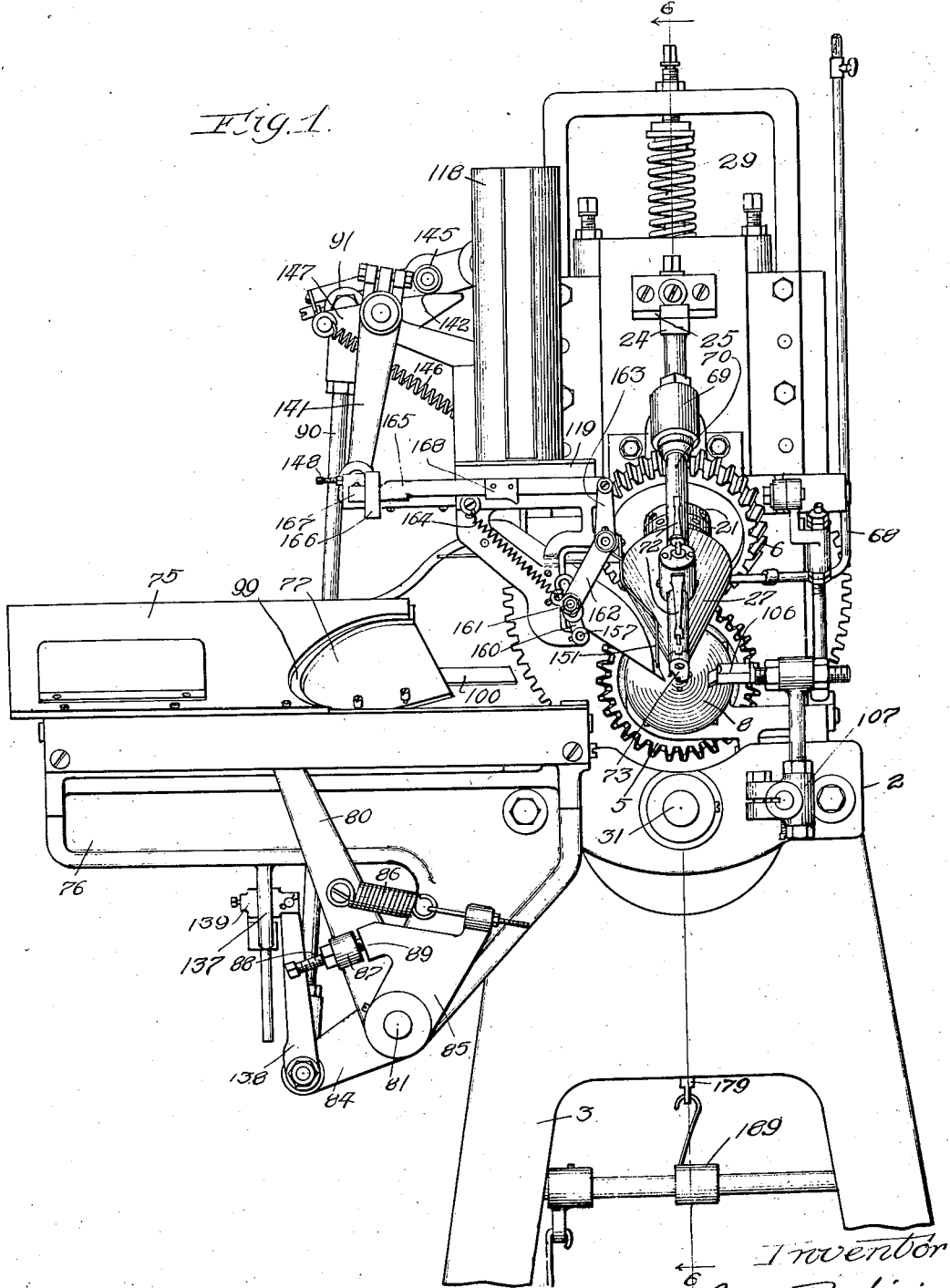
Fig. 1 is a front elevation of my device.
Figure 2:
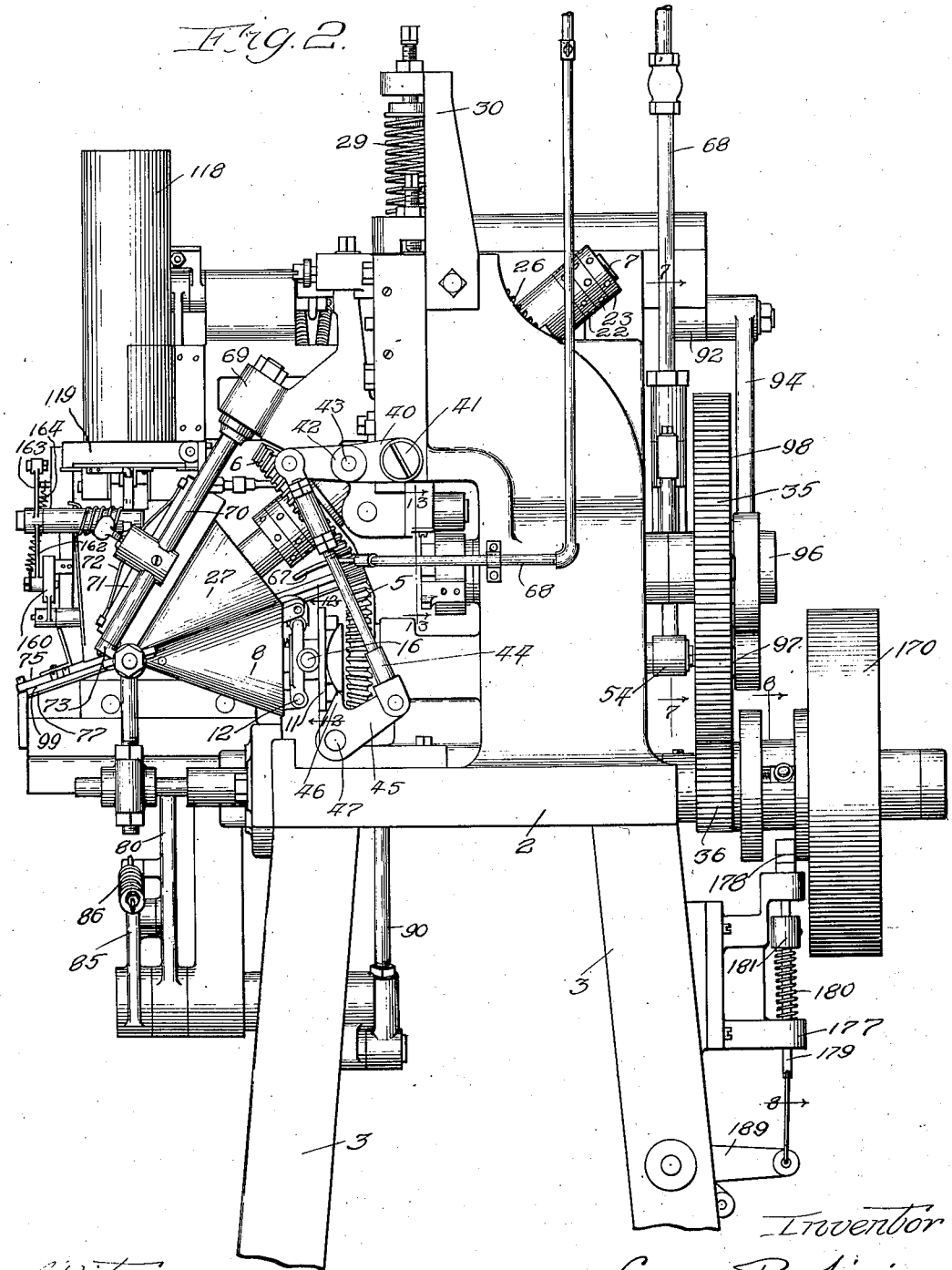
Fig. 2 is an elevation of my device seen from its left hand side.

In the form of my device shown in the drawings 1 is the frame or body portion of my device having a base 2 and suitable legs or other supporting means 3—3 rigidly attached to the base 2 for supporting the same in position. As shown a shaft 4 is rotatably mounted in suitable bearings formed in the lower part of the frame 1 with one end projecting at the front of the machine and connected by bevel gears 5 and 6 to a shaft 7 the axis of which is substantially in a common vertical plane with the shaft 4. A cone shaped die or roller 8 is formed to accurately correspond in shape and size to the interior form and size of the cup to be formed, and is rigidly attached to the projecting end of the shaft 4 and provided with suitable means for attaching a blank to the die so as to conveniently wrap the blank about the die to form a cup. In the form shown a clamp or finger 9 is pivotally mounted upon the rear or large end of the forming die 8 as at 10 and a yoke 11 is also pivotally mounted upon the die as at 12 with its free end pivotally connected as at 14 to the finger 9 so that a movement of the yoke longitudinally of the shaft toward the die will retract the finger from the face of the die while a movement of the yoke in the opposite direction will force the finger toward the face of the die. Any suitable means may be provided for controlling the movement of the yoke 11. As shown a spring 15 is provided between the end of the die and yoke adapted to normally hold the finger 9 in engaging position, that is, in contact with the face of the die; and a pair of rollers 16 are provided upon the yoke at opposite sides of the center line of the shaft 4 each adapted to co-operate with a collar 17 rotatably mounted upon the shaft 4 and adapted to move longitudinally thereof so that a movement of the collar toward the die will retract the finger 9 from the face of the die.

In the preferred construction the shaft 7 is rotatably mounted in a bearing 18 which is in turn pivotally attached at its lower front end as at 19 to a vertically movable slide or carriage 20 upon the frame 1 with suitable means upon the shaft to accurately control its longitudinal position in the bearing. As shown the gear 6 is mounted at the forward end of the bearing 18 with suitable nuts 21—21 upon the shaft engaging the hub of the gear to accurately control its position. A collar 22 is also provided upon the shaft 7 at the opposite end of the bearing 18 with suitable nuts 23—23 upon the shaft to control the position of the collar and permit of convenient adjustment of the shaft 7 longitudinally of the bearing 18. In the form shown the bearing 18 is provided with an arm 24 at its front end projecting upward and arranged to engage an adjustable stop 25 upon the carriage 20 to limit the pivotal movement of the bearing in one direction and a spring 26 or other suitable resilient means connects the upper rear end of the bearing to the carriage 20 to normally hold the arm 24 in contact with the stop 25 yet permit of suitable resilient motion of the bearing when the machine is in operation. A pressing die or roller 27 preferably of the same form as the die or roller 8 is rigidly mounted upon the lower forward end of the shaft 7 in position to co-operate with the forming die 8 to engage a blank between them with a substantially uniform pressure along the entire engaging surfaces of the dies.

An adjustable stop 28 is provided upon th frame 1 adapted to engage the upper end of the carriage 20 to limit the downward movement of the carriage and thereby the minimum distance between the dies, and a spring 29 or other suitable resilient means extends from the carriage upward to a yoke 30 upon the frame 1 to resiliently force the carriage downward to the stop 28.

Any suitable means may be provided for rotating the shaft 4. As shown a shaft 31 is rotatably mounted in suitable bearings in the base 2 and connected by suitable gears 32—33 to the shaft 4 for this purpose. A shaft 34 is also rotatably mounted upon the frame 1 and connected by gears 35—36 to the shaft 31 and a cam 37 is provided at the end of the shaft 34 adapted to engage a roller 38 or other suitable means upon the carriage 20 to periodically move the carriage upward and separate the dies 8 and 27.

In the preferred construction an arm 40 is provided with a central boss 42 rotatably mounted upon a stud 43 upon the carriage 20, and one end of the arm 40 is provided with a slotted opening engaging a stud or pin 41 upon the frame 1 so that each vertical movement of the carriage 20 will produce a corresponding movement of the free end of the arm 40. A rod 44 connects the free end of the arm 40 to the arm 45 of a bell-crank lever 45—46 pivotally mounted upon the base 2 as at 47 with the free end of the arm 46 forked and arranged to engage the collar 17 upon the shaft 4 so that each vertical movement of the carriage 20 will force the collar 17 towards the die 8 thus retracting the finger 9 from the face of the die 8. A suitable notch or indentation 48 is provided in the die 27 to receive the projecting portion of the finger 9 when the periphery of the dies are in contact. The movements of the several parts are so timed that when the carriage 20 is raised and the dies are separated, a blank of suitable form may be inserted between them and when the die 8 is rotated sufficiently to bring the finger 9 into engaging position the carriage 20 is released and its downward movement permits the finger 9 to resiliently move toward the face of the die 8 and engage the blank and immediately thereafter the die 27 will arrive in position to co-operate with the die 8 to engage the blank between them and the continued rotation of the dies will accurately form the blank to correspond with the shape of the forming die 8; the dies preferably making several rotations during the forming operation. As soon as the cup is suitably formed the carriage 20 is again raised thus separating the dies and retracting the finger 9 thus entirely releasing the formed cup upon the die 8.

Any suitable means may be provided for removing the cup from the die. As shown a passage 50 is provided extending centrally longitudinally of the die 8 and shaft 4 with ports 51 near the apex of the die, and a member 52 is connected to the rear end of the shaft having a passage extending longitudinally thereof with suitable transverse openings 53 connected therewith.

A sleeve 54 is rotatably mounted upon the member 52 having a chamber 55 in its inner wall at the extremities of the passages 53, and a pipe 56 (see Fig. 7) is rigidly attached to the sleeve 54 and connected to the chamber 55 for directing fluid under pressure into the chamber whence it passes through the openings 53 and central passage of the member 52 through passage 50 to the ports 51 thereby forcing the cup from the die. Any suitable means may be provided for controlling the admission of fluid to the pipe 56. As shown a valve casing 57 is attached to the pipe 56 with a passage extending through the casing connecting the pipe 56 to the fluid supply pipe 58. A closure 59 is provided in the casing with a suitable spring or other resilient means 61 for normally holding the same in closed position while a pin 62 is connected to the closure and projects at the end of the casing for forcing the closure from its seat to permit the passage of fluid through the casing. In the form shown a bracket 63 is provided at one side of the casing, and a latch 64 is pivotally attached to the bracket 63 and extends beyond the end of the pin 62 into the path of a roller 65 or other suitable means upon the gear 35 so that at each rotation of the gear the roller engages the end of the latch forcing the same upward against the pin and permitting fluid under pressure, preferably air to pass through the casing into the pipe 56 for removing a cup from the die as hereinbefore explained.

In the form shown paraffine or other water proofing material is provided upon one side of each of the blanks to water-proof the cup and also for attaching the over-lapping portion of the blank to the body of the formed cup. The paraffine or other material is preferably applied to the side of the blank which will be at the exterior of the cup when completed. In the preferred form the paraffine or other coating is slightly heated during the forming operation to facilitate the attachment of the over-lapping portions of the blank. For this purpose in the form shown a gas burner 67 is provided connected by a suitable supply pipe 68 to any convenient supply of gas or other liquid combustible (not shown) and arranged to direct a suitable flame against the large end of the pressing die 27 to warm the die.

It is also desirable to keep the surface of the pressing die 27 as free from paraffine or other foreign material which might accumulate from its contact with the exterior of the cup. For this purpose a boss 69 is provided upon the arm 24 and a holder 70 projects from the boss having a slot extending longitudinally therethrough. A scraper 71 is positioned in the slot with its face arranged to contact with the die 27 and a spring 72 is mounted upon the holder and engages the back of the scraper to resiliently force the same against the die.

In the preferred construction also a portion of the tip or apex of the die 27 is removed and a stationary block 73 is provided upon the holder adapted to engage the apex of the cup upon the die 8 and operate to accurately lay the folds of the blank at the apex of the cup to secure the most thorough attachment between them.

In the preferred construction suitable means are provided for mechanically placing the blank in position between the dies so that the finger 9 will engage the blank when the finger moves to engaging position. For this purpose a table 75 is rigidly mounted upon the base 2 of my device by a bracket 76 or other suitable means rigidly attached to the base 2, and a slide 77 is mounted on suitable guides 78 and 79 beneath the table 75 which are supported at their extremities on the bracket 76. An arm 80 is pivotally mounted in suitable bearings as at 81 upon the bracket 76 with its free end connected by a link 82 to one of the supporting brackets 83 at the rear of the slide 77 for connecting the slide 77 to the guides so that each oscillation of the arm 80 will cause a corresponding longitudinal movement of the slide 77 substantially in the plane of the meeting surfaces of the dies 8 and 27.

Figure 3:
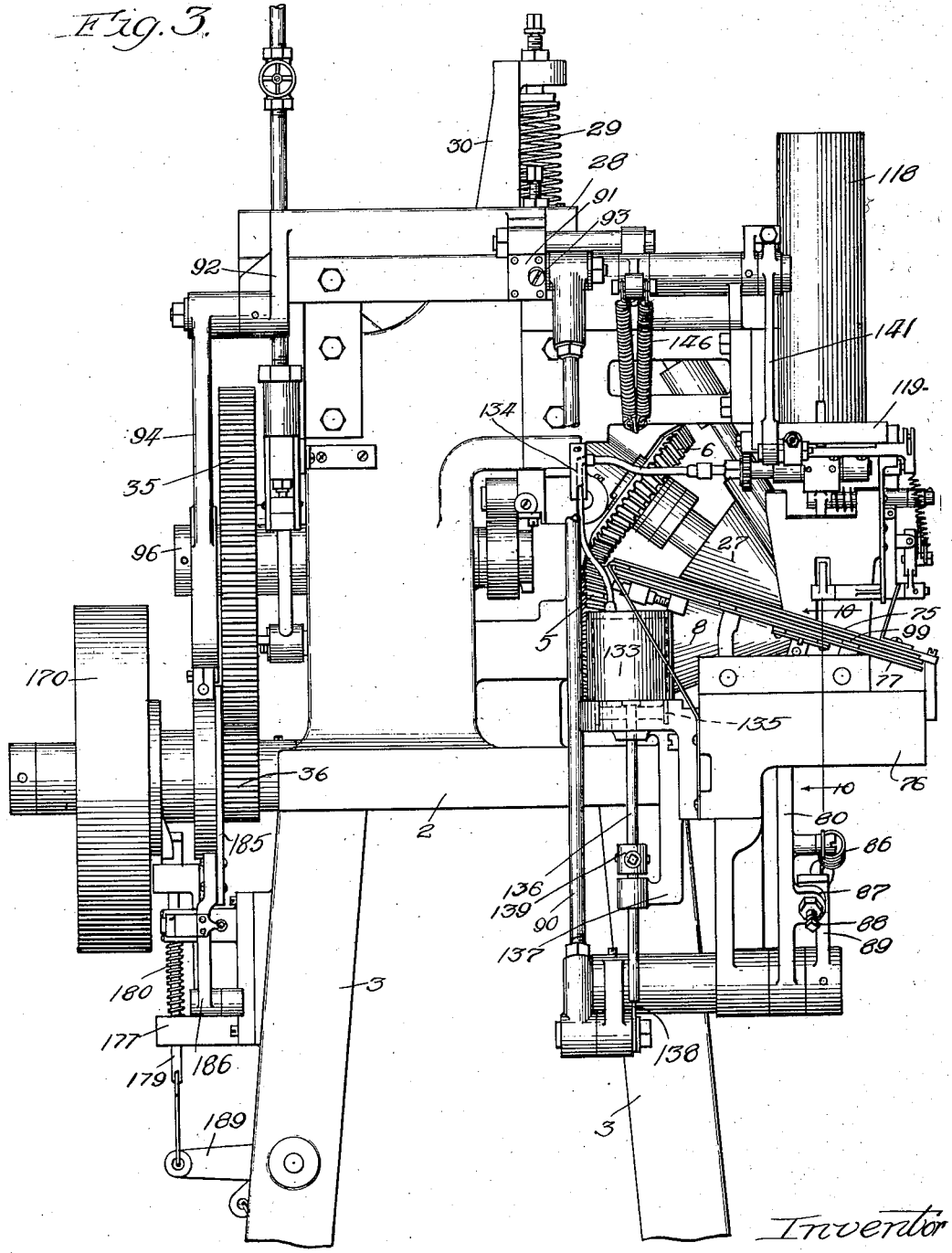
Fig. 3 is an elevation of my device seen from its right hand side.

Any suitable means may be provided for oscillating the arm 80. In the form shown a bell-crank 84—85 is mounted upon the shaft 81 with the free end of the arm 85 connected by a spring 86 to the lever 80. A boss 87 is also provided on the arm 80 with a screw 88 extending through the boss and arranged to normally contact with the part 89 of the lever 85. The several parts are so constructed and arranged that the spring 86 will resiliently maintain the screw 88 in contact with the part 89 of the lever 85. The free end of the arm 84 is connected by a rod 90 pivotally attached thereto to a bell-crank 91—92 at the upper part of the frame 1 (see Fig. 3) the pivotal connection between the rod 90 and the arm 91 is preferably adjustable longitudinally of the arm as by means of the screw 93 to adjust the operative length of the arm 91 to control the movement of the rod 90 and associated parts. Any suitable means may be provided to oscillate the bell-crank 91—92. As shown an arm 94 is pivotally connected to the free end of the arm 92 and provided near its opposite end with a slot 95 adapted to receive a guide 96 projecting at the center of the gear 35 while a roller or other suitable means attached to the end of the arm 95 engages a cam slot 98 in the gear to impart a longitudinal movement to the arm thereby rocking the bell-crank 91—92.

In the preferred construction the slide 77 is provided with a raised portion 99 formed to accurately correspond to the shape of one side of the blank to be used in my device so that a blank placed upon the slide will be accurately held in position to be presented to the dies. In the form of the blank for which my device is particularly adapted, a portion a near the center of the blank projects beyond the adjacent body portion and is adapted to wrap about the apex of the cup in finishing the same. This portion of the blank is preferably thrust through between the dies sufficiently to permit of rolling the same on the die at the finish of the forming operation. In order to support this portion of the blank and insure its proper insertion between the dies an auxiliary slide 100 is mounted on the lower side of the slide 77 with a portion projecting beyond the end of the slide 77 and extending below this portion of the blank. The auxiliary slide 100 is arranged to move longitudinally of the slide 77 with a spring 101 or other suitable resilient means for normally holding the auxiliary slide in extended position. However when the main slide 77 moves forward or toward the dies or rollers 8 and 27 sufficiently to bring the auxiliary slide 100 into desired proximity to the dies, a projection 102 upon the auxiliary slide engages a part 103 upon the bracket 76 thereby arresting the movement of the auxiliary slide while the main slide 77 continues to move forward until it brings the blank upon the slide into the desired position between the dies. When this point is reached a part 104 upon the arm 80 engages a screw 105 or other adjustable stop upon the bracket 77 thereby arresting the forward movement of the slide. The projecting portion of the blank in the meantime engages and rests upon an adjustable holder 106 at the opposite side of the die supported by a suitable bracket 107 upon the base 2 of my device.

In the form of cup shown a small circular piece of paper 115 is attached to the exterior of the cup to slightly separate the coated walls of the cups when the cups are nested together and also to more securely attach the overlapping portion of the blank to the body portion of the cup. To secure the most satisfactory results it is obvious that this reinforcing piece or tip 115 should be positioned upon the cup so that its diameter will rest upon the margin 116 of the over-lapping portion of the blank as shown in Fig. 18.
Any suitable means may be provided to feed the tips 115 one by one to the device at a predetermined point in the rotation of the dies to bring the tips in the desired position upon the finished cup. As shown in Figures 14 and 15 a vertical magazine 118 is provided of suitable form to receive and store the tips in a substantially horizontal position in the magazine. In the preferred construction the magazine 118 rests upon a base 119 having an opening therethrough corresponding to the internal cross section of the magazine. As shown a plate 120 is rigidly secured to the underside of the base 119 with a part projecting below the magazine adapted to engage the margins of the tips positioned therein to partially support the same. Suitable guides 121—121 are also provided on the underside of the base 119 and a slide 122 is positioned in the guides adapted to move longitudinally there-between substantially at right angles to the center line of the dies. In the preferred form the slide 122 consists of a substantially flat plate having an opening 123 formed therein of substantially the width of the magazine and a tongue 124 upon the plate, projects into the opening 123 on the side adjacent the dies. An off-set portion 125 is also provided in the plate 122 corresponding in form to the tongue 124 and positioned at the opposite side of the opening 123.

Suitable bearings 126 are provided on the under side of the slide 122 at each edge thereof and a shaft 127 is mounted in the bearings with a cam-shaped roller 128 rigidly secured thereto between the bearings 126. A pinion 129 is also rigidly mounted upon the shaft 127 and adapted to mesh with a rack 130 rigidly secured to the base 119 so that as the slide 122 is moved transversely of the magazine, the roller 128 will traverse the opening below the magazine and be partially rotated at each longitudinal movement of the slide. The diameter of the roller 128 and pinion 129 are substantially equal so that the periphery of the roller will merely roll upon the surface of the tips within the magazine with substantially no transverse movement in relation thereto, and the form of the roller is such that as the roller moves toward the edge of the tips farthest from the dies the face of the roller will gradually recede from the tips in the magazine to permit the more ready removal of the lower-most tip from the magazine. A passage 131 is provided extending from the face of the roller 128 to the center of the shaft 127 thence longitudinally of the shaft to its end adjacent the pinion 129. A flexible tube 132 (Fig. 17) connects the passage 131 to a cylinder 133 (Figure 3) rigidly attached to the bracket 76. Suitable means, as for example, the holder 134 is provided upon the frame of the machine to support the central portion of the tube 132. A piston 135 is provided in the cylinder 133 with a piston rod 136 attached thereto and extending downward through a guide 137 upon the base of the cylinder and a link 138 is pivotally attached to a collar 139 or other suitable means upon the piston rod and connects the piston rod 136 to the arm 84 so that at each oscillation of the arm 84 the piston 135 is moved longitudinally of the cylinder; the several parts being so formed that each downward movement of the piston in the cylinder will produce a strong suction in the tube 132.

Any suitable means may be provided for moving the slide 122 longitudinally. As shown a bracket 140 is provided upon the frame 1 of my machine with a bell-crank 141—142 pivotally mounted thereon. The arm 141 is provided with a slotted opening 143 at its free end adapted to engage a pin 144 upon the slide 122 so that at each oscillation of the arm 144 the slide is moved longitudinally. The arm 142 is provided with a cam face at its upper edge and a roller 145 is provided upon the arm 91 adapted to engage the arm 142 at each downward movement of the arm 91. Suitable springs 146 or other resilient means are provided extending from a projection 147 upon the arm 142 to a suitable portion of the bracket 140 to normally maintain the arm 142 at the upper limit of its movement and the slide 122 at the limit of its movement towards the dies. A screw 148 or other suitable means is provided upon the slide adapted to engage the base to accurately limit the movement of the slide towards the dies. The several parts are so constructed and arranged that when the slide 142 is at the extreme forward limit of its movement, that is, toward the dies, the opening into the passage 131 at the face of the roller 128 is at the margin of the tips within the magazine opposite the plate 120 and the piston 135 is commencing its downward movement thus producing a suction at the face of the roller 128 firmly attaching the margin of the lower-most tip in the magazine to the face of the roller 128 as shown in Fig. 14. Upon further operative movement of the machine the slide 122 is moved toward the opposite limit of its travel, the roller 128 rotating to bend the margin of the tip downward below the tongue 124 as shown in Fig. 16, the tongue 124 operating to support the remaining tips in the magazine while the tip attached to the roller 128 is gradually withdrawn until it arrives at the position shown in Fig. 15 at which time the piston 135 completes its downward stroke and commences its upward movement thus restoring the air pressure in the passage 131 and releasing the tip from the roller 128.
An inclined trough or chute 150 is arranged below the magazine 118 and positioned to receive the tips 115 when released from the roller 128 and direct the same into the space between the dies. A finger 151 is provided however, extending to the lower end of the chute 150 adapted to normally prevent the escape of the tip from the chute while the finger is in its normal position. As shown the finger 151 is pivotally mounted as at 152 upon a suitable bracket with a spring 153 arranged to normally maintain the finger in position to prevent the escape of the tip from the chute. An arm 154 is rigidly connected to the finger 151 with an adjustable shoe 155 at its upper face. A pivotally mounted latch 156 is provided upon the slide 122 adapted to engage the shoe 155 when the slide is moving to withdraw a tip from the magazine and tilt the finger as shown in broken lines in Fig. 16 out of its normal position.

A shaft 157 is rotatably mounted at the bottom of the chute 150 and a hook 158 is rigidly secured to the shaft with its free end projecting through the bottom of the chute substantially at its longitudinal center line. A guard or plate 159 is provided extending from the bottom of the chute over the hook 158 adapted to prevent the tips from engaging the hook in their downward movement. An arm 160 (see Fig. 1) is rigidly attached to the forward end of the shaft 157 and provided with a slot near its free end adapted to receive a roller 161 upon the free end of a bell-crank 162—163 pivotally mounted upon the bracket attached to the base 119 of the magazine. A spring 164 is attached to the free end of the arm 162 and arranged to normally draw the arm toward the free end of the slide 122. The free end of the arm 163 is pivotally attached to a link 165 extending toward the outer end of the slide 122 and supported upon the slide by the bearing 166 upon the slide the link 165 having a laterally projecting portion 167 at its free end adapted to engage the bearing 166 as the slide moves toward the outward limit of its movement to carry the link with the slide. A stop 168 is also provided upon the link 166 to limit its movement in the opposite direction. The several parts are so timed and arranged that after the tip 115 arrives at the discharge end of the chute and engages the finger 151, the hook 158 is moved to engage the upper edge of the tip and slightly buckle the tip as shown in Fig. 16. When the several parts arrive in the position at which it is desirable to place the tip upon the cup the dog 156 engages the shoe 155 thereby suddenly removing the finger from its normal position and permitting the tip to spring by its own elasticity into the space between the dies.

As herein before stated it is desirable that the dies should make several complete rotations to properly form the cup and attach the tip in position. For this reason it has been found desirable to provide mechanism for driving my machine whereby when started the machine will continue to operate until one complete cycle of operation is completed, that is, until a blank removed from the feeding table is discharged from the device as a finished cup.

Any suitable mechanism may be provided for this purpose. As shown a driving pulley 170 adapted to be rotated by a belt or other suitable means (not shown) is loosely mounted upon the main or driving shaft 31 of my device near its end and is provided with a groove 171 at the inner face of its hub having a jaw or stop 172 extending entirely across the groove and rigidly secured in position therein. A sleeve 173 is rigidly attached to the shaft 31 in any suitable manner and provided with a bolt or pin 174 extending substantially parallel with the shaft 31 with its outer end projecting into the groove 171 and arranged to engage the jaw or stop 172 to rotatively connect the pulley 170 with the sleeve 173. A spring 175 or other suitable resilient means is provided to normally maintain the bolt 174 in engaging position. A roller 176 is also provided upon the bolt 174 as shown in Fig. 9.

Figure 4:
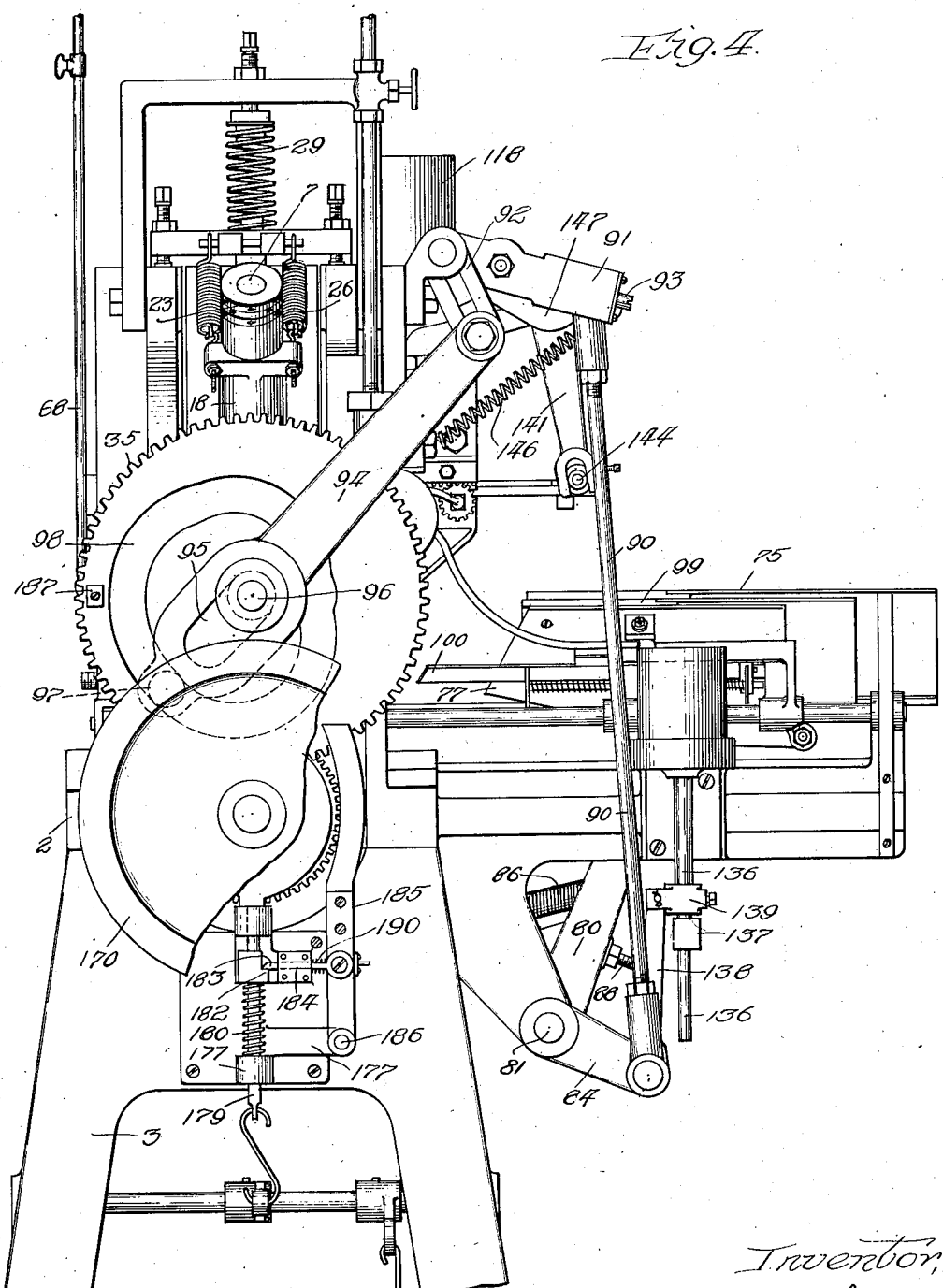
Fig. 4 is a rear elevation of my device.
Figure 5:
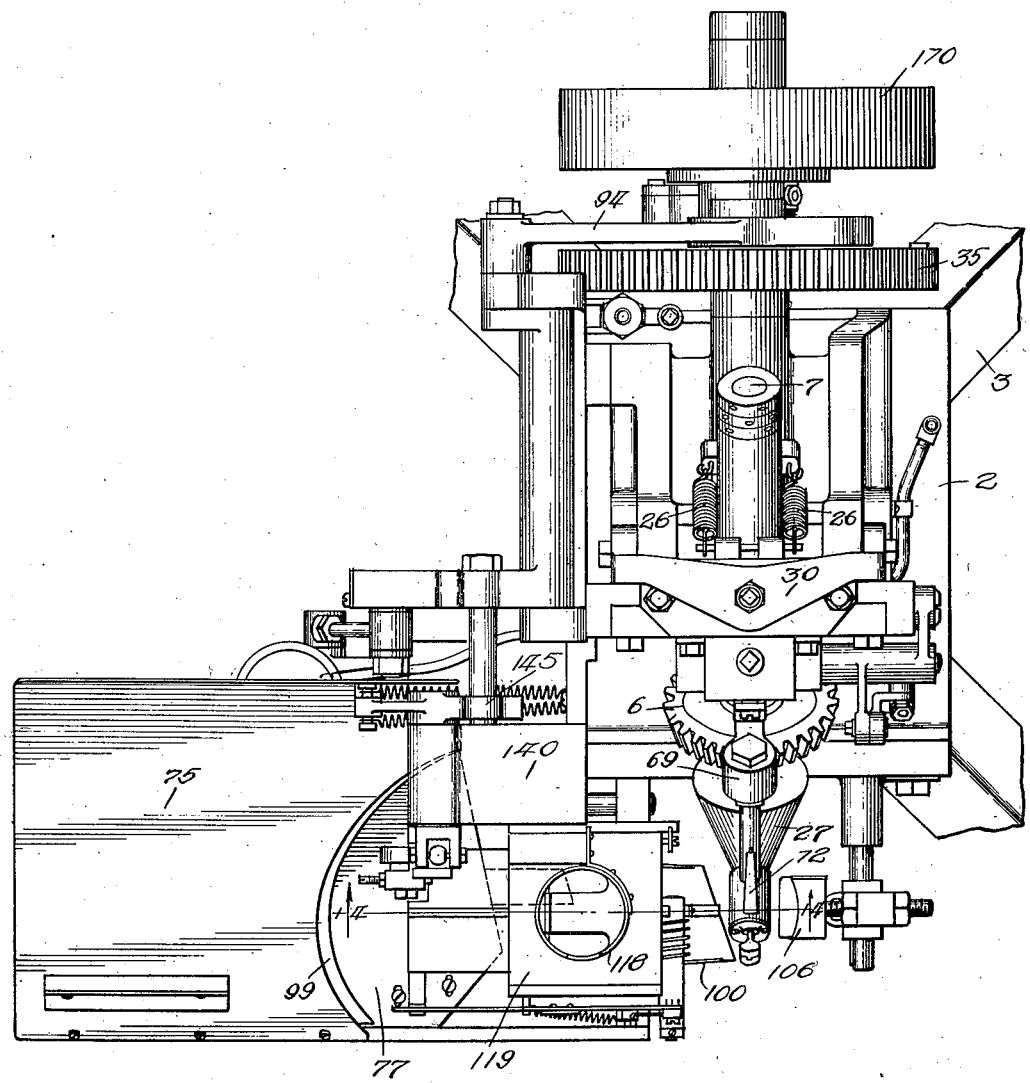
Fig. 5 is a top plan view of my improvement.

A bracket 177 is rigidly mounted upon the frame of my device and a cam 178 provided with a stem 179 is mounted in the bracket 177; the stem 179 being adapted to move longitudinally in the bracket with a spring 180 or other suitable resilient means tending to hold the stem at the upper limit of its movement with the cam 178 in position to engage the roller 176 and retract the bolt from the groove 171 thereby disengaging the bolt 174 from the jaw 172 and releasing the sleeve 173 from the driving pulley 170. A collar 181 is rigidly secured to the stem 179 and provided with a shoulder 182 on one side (see Figs. 4 and 8) and a latch 183 is provided in a suitable bearing 184 upon the bracket 177 adapted to engage the shoulder 182 and hold the cam and stem retracted. A trigger 185 is pivotally mounted upon the bracket 177 as at 186 and connected to the latch 183 intermediate its ends with the free end of the trigger extending into the path of the projection 187 upon the gear wheel 35 so that at each rotation of the wheel the projection 187 will engage the free end of the trigger 185 and disengage the latch 183 from the shoulder 182 thereby releasing the cam 178 and permitting the same to operate as hereinbefore described to disengage the driving shaft from the pulley 170 and thereby stop the machine. Suitable mechanism as at 189 is provided and connected to the lower end of the stem 179 to manually withdraw the cam from engaging position. A spring 190 or other convenient means is provided to normally maintain the trigger 185 and latch 183 in position to engage the shoulder 182 and hold the cam and stem in the withdrawn position.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a machine for forming paper cups from suitably formed blanks, a pair of similar conical rollers comprising a forming roller and a pressing roller adapted to engage a blank between them, resilient means tending to force said rollers toward each other, and mechanism for continuously rotating said rollers, in combination with means co-operating with said forming roller for engaging a blank to hold said blank in position upon said roller during the forming operation, and means for separating said rollers and releasing the cup when the forming operation is completed.

2. In a machine for forming paper cups from suitably formed blanks, a pair of similar conical rollers comprising a forming roller and a pressing roller adapted resiliently to engage a blank between them, a movable carriage, a bearing mounted upon said carriage for supporting said pressing roller, and mechanism for continuously rotating said rollers, in combination with means for automatically moving said carriage to separate said rollers to release the cup when the forming operation is completed.

3. In a machine for forming paper cups from suitably formed blanks, a pair of similar conical rollers comprising a forming roller and a pressing roller adapted resiliently to engage a blank between them, a movable carriage, a bearing pivotally mounted upon said carriage for supporting said pressing roller, and mechanism for continuously rotating said rollers, in combination with means co-operating with said forming roller for engaging a blank to hold said blank in position upon said roller during the forming operation, and means for moving said carriage to separate said rollers to release the cup when the forming operation is completed.

4. In a machine for forming paper cups from suitably formed blanks, a pair of similar conical rollers comprising a forming roller and a pressing roller adapted to engage a blank between them, a movable carriage, a bearing mounted upon said carriage for supporting said pressing roller, resilient means partially controlling the position of said bearing, and mechanism for continuously rotating said rollers, in combination with means for moving said carriage to separate said rollers to release the cup when the forming operation is completed.

5. In a machine for forming paper cups from suitably formed blanks, a pair of similar conical rollers comprising a forming roller and a pressing roller adapted to engage a blank between them, a movable carriage, a bearing mounted upon said carriage for supporting said pressing roller, an adjustable stop adapted to engage said bearing to limit the pivotal movement of said bearing, and mechanism for continuously rotating said rollers, in combination with means co-operating with said forming roller for engaging a blank to hold said blank in position upon said roller during the forming operation, and means for separating said rollers and releasing the cup when the forming operation is completed.

6. In a machine for forming paper cups from suitably formed blanks, a pair of similar conical rollers comprising a forming roller and a pressing roller adapted to engage a blank between them, a movable carriage, a bearing pivotally mounted upon said carriage for supporting said pressing roller, resilient means partially controlling the position of said bearing, means operatively connected to said rollers for automatically moving said carriage to change the distance between said rollers, a stop adapted to engage said bearing to limit the pivotal movement of said bearing, an adjustable stop for controlling the minimum distance between said rollers, and mechanism for continuously rotating said rollers, in combination with means co-operating with said forming roller for engaging a blank to hold said blank in position upon said roller during the forming operation, and means for automatically releasing the cup when the forming operation is completed.

7. In a machine for forming cups from suitably formed blanks, a pair of similar conical rollers comprising a forming roller and a pressing roller adapted to engage a blank between them, mechanism co-operating with the surface of said pressing roller to prevent the accumulation of material upon said roller, and mechanism for continuously rotating said rollers, in combination with means for separating said rollers and releasing the cup when the forming operation is completed.

8. In a machine for forming paper cups from suitably formed blanks, a pair of similar conical rollers comprising a forming roller and a pressing roller adapted to engage a blank between them, a non-rotatable member adapted to co-operate with the apex of said forming roller to form and seal the tip of said cup, and mechanism for continuously rotating said rollers synchronously, in combination with means for separating said rollers and releasing the cup when the forming operation is completed.

9. In a machine for forming paper cups from suitably formed blanks, a pair of similar conical rollers comprising a forming roller and a pressing roller adapted to engage a blank between them, mechanism for continuously rotating said rollers, and means for presenting a blank to said rollers at a predetermined point in their rotation, in combination with means co-operating with said forming roller for engaging a blank to hold said blank in position upon said roller during the forming operation, and means for separating said rollers and releasing the cup when the forming operation is completed.

10. In a machine for forming paper cups from suitably formed blanks, a pair of similar conical rollers comprising a forming roller and a pressing roller adapted to engage a blank between them, mechanism for continuously rotating said rollers, and a movable slide provided with means for holding a blank in a fixed position for presenting a blank to said rollers at a predetermined point in their rotation, in combination with means for releasing the cup when the forming operation is completed.

11. In a machine for forming paper cups from suitably formed blanks, a pair of similar conical rollers comprising a forming roller and a pressing roller adapted to engage a blank between them, mechanism for rotating said rollers, and means connected to said rotating mechanism for presenting a blank to said rollers at a predetermined point in their rotation, in combination with means for engaging a blank to hold said blank in position upon said roller during the forming operation, and means for releasing the cup when the forming operation is completed.

12. In a machine for forming paper cups from suitably formed blanks, a pair of similar conical rollers comprising a forming roller and a pressing roller adapted to engage a blank between them, mechanism for rotating said rollers, and a movable slide provided with means for holding a blank in a fixed position connected to said rotating mechanism for presenting a blank to said rollers at a predetermined point in their rotation, in combination with means for releasing the cup when the forming operation is complete.

13. In a machine for forming paper cups from suitably formed blanks, a pair of similar conical rollers comprising a forming roller and a pressing roller adapted to engage a blank between them, and mechanism for rotating said rollers, in combination with a spring actuated finger pivotally mounted externally upon and co-operating with said forming roller for automatically engaging a blank to hold said blank in position upon said roller during the forming operation, and means for separating said rollers and releasing the cup when the forming operation is completed.

14. In a machine for forming paper cups from suitably formed blanks, a pair of similar conical rollers comprising a forming roller and a pressing roller adapted to engage a blank between them, a movable carriage supporting said pressing roller, and mechanism for rotating said rollers, in combination with a rotatable member co-operating with said carriage for separating said rollers and releasing the cup when the forming operation is complete.

15. In a machine for forming paper cups from suitably formed blanks, a pair of similar conical rollers comprising a forming roller and a pressing roller adapted to engage a blank between them, a carriage supporting said pressing roller, a stop for controlling the minimum distance between said rollers, resilient means tending to hold said carriage against said stop and mechanism for rotating said rollers, in combination with means for automatically separating said rollers and releasing the cup when the forming operation is completed.

16. In a machine for forming paper cups from suitably formed blanks, a pair of similar conical rollers comprising a forming roller and a pressing roller adapted to engage a blank between them, means for supporting said rolls, resilient means tending to force said rollers toward each other, mechanism for rotating said rollers, and means for presenting a blank to said rollers at a predetermined point in their rotation, in combination with means co-operating with said forming roller for engaging a blank to hold said blank in position upon said roller during the forming operation, and means for separating said rollers and releasing the cup when the forming operation is completed.

17. In a machine for forming paper cups from suitably formed blanks, a pair of similar conical rollers comprising a forming roller and a pressing roller adapted to engage a blank between them, a movable carriage, a bearing pivotally mounted upon said carriage for supporting said pressing roller, resilient means partially controlling the position of said bearing, a stop adapted to engage said carriage to control the minimum distance between said rollers, resilient means engaging said carriage tending to hold the carriage against said stop, mechanism for rotating said rollers, and a movable slide provided with means for holding a blank in a fixed position connected to said rotating mechanism, in combination with means periodically engaging said carriage to separate said rollers and release the cup when the forming operation is completed.

18. In a machine for forming paper cups from suitably formed blanks, a pair of rollers comprising a forming roller and a pressing roller adapted to co-operate to wrap the blank upon the forming roller, and means for rotating said rollers, in combination with means for inserting a re-enforcing piece or tip between said rollers at a predetermined point in the forming operation.

19. In a machine for forming paper cups from suitably formed blanks, a pair of rollers comprising a forming roller and a pressing roller adapted to co-operate to wrap the blank upon the forming roller, and means for rotating said rollers, in combination with a magazine for containing re-enforcing pieces for said cups, said magazine having an opening at its bottom, and means for removing a re-enforcing piece from the bottom of said magazine and presenting said piece to said rollers at a predetermined point in the forming operation.

20. In a machine for forming paper cups from suitably formed blanks, a pair of rollers comprising a forming roller and a pressing roller adapted to co-operate to wrap the blank upon the forming roller, and means for operating said rollers, in combination with a magazine for containing re-enforcing pieces for said cups, mechanism for automatically removing said pieces from said magazine one by one, and independent means for presenting each piece to said rollers at a predetermined point in the forming operation.

21. In a machine for forming paper cups having a re-enforcing piece or tip on the side thereof, a magazine for containing said re-enforcing pieces, said magazine having an opening at its bottom, mechanism for automatically removing said pieces from said magazine through said bottom opening one by one, and independent means for presenting each piece to the cup at a predetermined point in the forming operation.

22. In a machine for forming receptacles from suitable blanks, the combination of a pair of rollers upon one of which the receptacles are formed, means for continuously rotating said rollers, slidable means for feeding blanks to said rollers to be formed into receptacles, and auxiliary feed means for springing reinforcing blanks between the rollers.

23. In a machine for forming receptacles from prepared blanks, a pair of continuously operating forming rollers, and a plurality of relatively slidable blank feeding means adapted to transfer a blank to the rollers at a predetermined time in their operation.

24. In a machine for forming receptacles from suitable blanks, the combination of a pair of forming rollers, a plurality of relatively slidable feed means adapted to transfer a blank to said rollers at a predetermined period of their operation, a spring for normally holding one of said feed means in extended position, and means for separating the rollers to receive a blank at said predetermined time.

25. In a machine for forming receptacles from suitable blanks, a forming roller, a blank feeding means adapted to cooperate with said roller, and automatic means for transferring a reinforcing tip to the forming roller after the blank has been fed thereto and partially formed.

26. In a machine for forming paper cups, the combination of a pair of forming rollers, one of said rollers being positively driven and the other being adapted to be brought into operative contact with said driven roller at predetermined times, and means connecting both of the rollers whereby they are always maintained in rotation at equal rates of speed whether in contact with each other or separated.

27. In a cup forming machine, a pair of conical cup forming rollers, means for continuously rotating the same, and a non-rotatable member adapted to co-operate with the apex of one of said rollers to form and seal the tip of a cup being formed by said roller.

28. In an automatic cup forming machine the combination of a pair of forming rollers, and means for transferring a prepared blank to the rollers, said means including a fixed table, a reciprocating slide in said table, and a spring-held projection on said slide whereby the extending portion of each blank is supported in feeding position until brought by the slide into close proximity to the forming rollers.

29. In an automatic cup forming machine the combination of a pair of forming rollers, and means for transferring a prepared blank to the rollers, said means including a fixed table, a reciprocating slide in said table, a spring-held projection on said slide whereby the extending portion of each blank is supported in feeding position until brought by the slide into close proximity to the forming rollers, and means for retarding the forward motion of said extension when the slide is nearing the forming rollers.

30. In a cup making machine, the combination with a pair of forming cones, means for operating the same, slidable means for feeding blanks to said cones to be formed into cups, a magazine for reinforcing members, a mechanism for discharging a reinforcing member from the magazine, a chute, a finger for holding the reinforcing member on the chute, means on said chute for slightly buckling the reinforcing member, and means for automatically releasing the finger to permit the buckled reinforcing member to spring between the forming cones.

31. In a cup forming machine, a pair of dies comprising a forming cone and a pressing cone, a slidable carriage supporting the pressing cone, a roller on said carriage, a cam adapted to co-act with said roller to move the carriage as a whole away from the forming cone, and means for rotating said cam.

32. In a machine for forming receptacles from blanks, rotatable forming means, mechanisms for respectively sliding and springing receptacle blanks and reinforcing blanks into the forming means to be formed into reinforced receptacles, and a discharging means for removing the reinforced receptacles from the forming means.

33. In a machine for forming receptacles from blanks, a slidable main feeding means, an auxiliary feed means slidable with respect thereto, a continuously operated forming means, and a discharging means for the receptacles.

34. In a machine for forming receptacles from blanks, a reciprocable feeding means, a continuously operated forming means, and a discharging means for the receptacles, said feeding means including a blank holding magazine and an additional single blank holding means.

35. In a machine for forming reinforced receptacles from blanks, a feeding means for the blanks, a feeding means for the reinforcing members, a forming means, and a discharging means for the receptacles, said forming means including a pair of continuously operated coacting dies.

36. In a machine for forming reinforced receptacles from blanks, a feeding means for the blanks, a feeding means for the reinforcing members, a forming means, and a discharging means for the receptacles, said forming means including a pair of continuously operated coacting dies which are rotated a plurality of times in the formation of each blank.

37. In a machine for forming reinforced receptacles from blanks, a feeding means for the blanks, a feeding means for the reinforcing members, a forming means, and a discharging means for the receptacles, said forming means including a pair of continuously operated coacting dies which are rotated a plurality of times in the formation of each blank and are in contact during a portion of said revolutions.

38. In a machine for forming reinforced receptacles from blanks, a feeding means for the blanks, a feeding means for the reinforcing members, a forming means, and a discharging means for the receptacles, said forming means including a pair of coacting dies, one of which is continuously operated.

39. In a machine for forming reinforced receptacles from blanks, a feeding means for the blanks, a feeding means for the reinforcing members, a forming means, a discharging means for the receptacles, said forming means including a pair of continuously operated coacting dies, and automatic means for moving said dies into and out of operative relation.

40. In a machine for forming receptacles from blanks, a slidable feeding means, a continuously operated forming means, a presser means adapted to co-act therewith, and a slidable support for said presser means.

41. In a machine for forming receptacles from blanks, a slidable feeding means, a continuously operated forming means, a presser means adapted to co-act therewith, a slidable support for said presser means, and means for intermittently raising said slidable support to permit the blanks to be fed between the forming means and said presser means.

42. In a receptacle forming machine the combination with continuously operating forming cones, and intermittently operated feeding mechanisms for sliding and springing blanks and reinforcing tips between said forming cones.

43. In a machine for forming reinforced receptacles from suitable blanks, a continuously operated forming means, intermittently operated feeding means for feeding blanks into the forming means, said forming means including a pair of conical dies.

44. In a machine for forming reinforced receptacles from suitable blanks, a continuously operated forming means, an intermittently operated feeding means for feeding blanks into the forming means, said forming means including a pair of conical dies, one of said dies being relatively fixed and the other movable to and from the same.

45. A machine for forming reinforced receptacles from blanks, including a feeding means for the blanks, a feeding means for the reinforcing members, a forming means, and a discharging means for the formed receptacles.

46. In a machine for forming reinforced paper cups from suitable blanks, a pair of dies adapted to receive the blanks between them, and mechanism for continuously rotating the dies to form the cups, in combination with automatic means for delivering a reinforcing tip thereto.

47. In a cup forming machine, the combination with conical members for forming conical cups from blanks, of automatic means for delivering reinforcing tips to said conical members to be wrapped around the tips of said cups.

48. In a cup forming machine, the combination with a pair of forming dies, of a blank gripping mechanism on one of said dies, and a scraping mechanism adapted to co-act with the other of said dies.

49. In a machine for forming reinforced receptacles from blanks, a forming mechanism, means for feeding blanks thereto, and means for springing reinforcing members into the field of operation of said forming mechanism.

50. In a cup forming machine, the combination with continuously rotating cup forming dies, of a pivoted finger, means for buckling a blank against said finger, and mechanisms for tilting the finger to permit the buckled blank to be sprung between the forming dies.

51. In a cup forming machine the combination with a pair of continuously rotating separable forming cones, of a gravity feed chute, means for delivering a blank thereto, a pivoted finger adapted to act as a stop for the blank, means for buckling the blank against said finger, and means for tilting said finger at a predetermined time to permit the buckled blank to be sprung between the forming cones.

52. In a cup forming machine, the combination with a rotatable forming die, of a vertically slidable carriage, a presser die pivotally supported on said carriage, and resilient means on said carriage for resiliently holding the presser die in contact with said forming die.

53. In a cup forming machine, the combination with a rotatable forming die, of a presser die adapted to co-act therewith to form a cup from a blank, a shiftable support for said presser die, a scraping mechanism for said presser die mounted on said shiftable support, and means for heating the presser die to render the blank adhesive.

54. In a machine for forming receptacles from blanks, a pair of rotatable forming cones, and blank feeding elements relatively slidable with respect to one another for feeding the blanks to said forming cones.

55. In a machine for forming receptacles from blanks, the combination with a pair of forming rollers, a slidable main feed member for feeding blanks to said rollers, an auxiliary feed member relatively slidable with respect to said main feed member to assist the same in feeding blanks to said rollers, a spring for normally holding said auxiliary feed member in extended position, and a stop for arresting the movement of said auxiliary feed member while the main feed member continues to advance.

56. In a cup forming machine, a pair of cup forming rollers, means for feeding blanks thereto to be formed into cups, a scraping mechanism co-acting with one of said rollers to scrape off material which might gather thereon, and a member associated with the scraping mechanism adapted to co-operate with the other roller to form and seal the tips of the cups when being formed.

57. In a paper cup forming machine the combination of a driving shaft, two shafts driven thereby at different rates of speed, one of the shafts having mounted thereon a cup forming die and the other shaft having mounted thereon means for releasing the formed cup from the cup forming die upon completion of the cup forming operation.

58. In a machine for forming paper cups from suitably formed blanks, a pair of rollers comprising a forming roller and a pressing roller adapted to engage a blank between them, one of said rollers being mounted in a pivoted bearing, mechanism for continuously rotating the rollers, in combination with means cooperating with said forming roller to engage a blank to hold said blank in position upon said roller during the forming operation, and means acting on the pivoted bearing for separating said rollers and releasing the cup when the forming operation is completed.

59. In a machine for forming paper cups from suitably formed blanks, a pair of rollers comprising a forming roller and a pressing roller adapted to engage a blank between them, one of said rollers being mounted in a pivoted bearing, mechanism for continuously rotating said rollers, means for feeding a blank between the rollers at a predetermined time, means cooperating with the forming roller by engaging the end of the blank to hold said blank in position upon said roller during the forming operation, and means acting on the pivoted bearing for separating the rollers and releasing the cup when the forming operation is completed.

60. In a machine for forming paper cups from suitably formed blanks, a pair of rollers comprising a forming roller and a pivotally mounted pressing roller adapted to engage a blank between them, and mechanism for continuously rotating said rollers, in combination with means for holding a blank in position upon one of said rollers during the forming operation, and means operating to simultaneously separate the rollers and eject the formed cups when the forming operation is completed.

61. A paper cup former comprising a frame, a head supported on the frame, a shaft journalled horizontally in the head and provided at one end with a conical cup forming die, means for connecting the shaft with a source of power, a sleeve pivoted upon the head, a shaft journalled in the sleeve, an upper cup forming die secured to the shaft and arranged to contact along its surface with the surface of the lower die, a driving connection between the shafts supporting said dies, a feed table adjacent to the contacting surfaces of the dies for holding blanks and feeding them between said dies, a gripper finger on the lower die for engaging a blank, the upper die having a depression therein to admit of the gripper finger, a spring normally pressing the upper die downward into contact with the lower die, means for separating the dies at predetermined intervals, fluid operated means for discharging the formed articles from the lower die, said fluid operated means being controlled by the relative position of the dies.

62. A paper cup former comprising upper and lower dies, the lower die being relatively fixed, means for rotating both dies continuously, the upper die being mounted to swing away from the lower die, and means for lifting the upper die away from the lower die, said means comprising a cam driven by a gear cooperating with the main driving gear.

63. A paper cup former comprising a relatively fixed lower die, means for rotating said die, an upper die mounted to swing toward and from the lower die, a spring normally pressing the upper die into contact with the lower die, means operated by the rotating means for separating the dies and holding them apart during predetermined intervals, ejecting means for the cup in connection with the lower die, and means operated by the die separating means for controlling the said ejecting means.

64. In a machine for forming paper cups from suitable blanks, a pair of conical rollers comprising a relatively fixed forming roller and a pivotally mounted pressing roller adapted to engage a blank between them, mechanism for continuously rotating both of said rollers, in combination with means on the forming roller for engaging a blank to hold it in position upon said roller during the forming operation, and means for separating the rollers, releasing the cup and ejecting it from the forming roller when the forming operation is completed.

65. In a paper cup forming machine the combination of a main driving shaft, three auxiliary shafts driven from the main driving shaft, two of said auxiliary shafts being provided with cup forming cones and the other shaft being provided with a cam and an actuating gear, cup ejecting means on one of the cup forming cones, and means operated by the actuating gear to eject the cup.

66. In a paper cup forming machine the combination of a pair of conical cup forming dies, a main driving shaft, two auxiliary shafts driven thereby, one shaft operating the cup forming dies and the other shaft provided with a plurality of mechanisms for separating the dies at predetermined intervals and for reciprocating a feed table for feeding properly formed blanks to the dies at predetermined intervals.

67. In a paper cup forming machine the combination of a pair of conical cup forming dies, a main driving shaft, two auxiliary shafts driven thereby, one shaft operating the cup forming dies and the other shaft provided with means for separating the dies at predetermined intervals and for reciprocating a feed table for feeding properly formed blanks to the dies at predetermined intervals, and means for ejecting the formed cups from the cup forming dies when the forming operation is completed.

68. In a machine for forming receptacles, a pair of coacting conical forming dies, means to separate the dies at intervals, and means for predetermining the time of such separation.

69. In a machine for forming receptacles, a pair of coacting forming dies, means to separate the dies at intervals, driving means for said means and for said dies, and means on said driving means for determining the time of separation of the forming dies.

70. In a machine for forming receptacles, the combination of blank feeding means, continuously rotating forming means, and discharging means all operated by a master gear.

71. In a machine for forming paper cups from suitably formed blanks, a pair of conical rollers comprising a forming roller and a pressing roller adapted to engage a blank between them, and mechanism for continuously rotating the pressing roller in combination with clamping mechanism mounted upon the forming roller for engaging a blank to hold said blank in position upon said roller.

72. A cup forming machine comprising mechanisms for forming a cup, and means on the machine for causing the machine when started to continue to operate until a cycle of operations is completed.

73. A machine for forming cups from blanks which comprise a major portion and a minor portion, said machine having forming means adapted to first receive the major portion of a blank and form the same into a cup and then form the minor portion of said blank around the formed major portion to reinforce the same.

74. In a cup forming machine, the combination with a pair of cup forming dies, of means for heating one of said dies to render cup blanks adhesive while being formed into cups by said dies, and adjustable means for scraping the heated die.

75. In a cup forming machine the combination with a cup forming die, of a pivotally mounted cup presser die for co-action therewith, and a scraping mechanism and a heating means for said cup presser die.

76. In a cup forming machine the combination with a pair of cup forming dies, of means for directing a flame against one of said dies to heat the same to render cup blanks adhesive, and means for blowing compressed air through the other of said dies to eject a completed cup therefrom.

77. In a machine for forming cups from suitably formed blanks, a pair of dies comprising a forming die and a pivotally mounted pressing die adapted to engage a blank therebetween, means for heating said pressing die to render the blank adhesive, mechanisms for continuously rotating the dies, and means for swinging the pressing die about its pivot for releasing the cup when the forming operation is completed.

In testimony whereof, I have hereunto signed my name in the presence of two subscribing witnesses.

CESARE BARBIERI.

Witnesses:
L. T. CONWAY,
GABRIEL SCABANO.